(12) United States Patent
Ramakrishnan (10) Patent No.: US 6,629,114 B2
(45) Date of Patent: Sep. 30, 2003

(54) METHOD, SYSTEM, AND COMPUTER PROGRAM PRODUCT FOR MANAGING A RE-USABLE RESOURCE

(75) Inventor: Balakrishnan Ramakrishnan, Sunnyvale, CA (US)

(73) Assignee: Riverstone Networks, Inc., Santa Clara, CA (US)

( * ) Notice: Subject to any disclaimer, the term of this patent is extended or adjusted under 35 U.S.C. 154(b) by 202 days.

(21) Appl. No.: 09/888,209

(22) Filed: Jun. 22, 2001

(65) Prior Publication Data

US 2002/0198886 A1 Dec. 26, 2002

(51) Int. Cl.[7] ............................................. G06F 17/30
(52) U.S. Cl. ....................................... 707/206; 709/219
(58) Field of Search ................................ 707/206, 100, 707/102, 103 R, 200; 709/104, 108, 213, 219; 717/116; 345/543

(56) References Cited

U.S. PATENT DOCUMENTS

| | | | |
|---|---|---|---|
| 5,432,908 A | 7/1995 | Heddes et al. | 711/147 |
| 5,687,368 A * | 11/1997 | Nilsen | 707/103 R |
| 5,765,165 A | 6/1998 | Harper | 707/200 |
| 5,848,423 A * | 12/1998 | Ebrahim et al. | 707/206 |
| 5,920,561 A | 7/1999 | Daniel et al. | 370/395.6 |
| 6,081,665 A * | 6/2000 | Nilsen et al. | 717/116 |
| 6,223,630 B1 | 5/2001 | Stanton | 710/56 |
| 6,374,286 B1 * | 4/2002 | Gee et al. | 709/108 |
| 6,526,422 B1 * | 2/2003 | Flood et al. | 707/206 |

\* cited by examiner

Primary Examiner—Diane D. Mizrahi
(74) Attorney, Agent, or Firm—Mark Wilson

(57) ABSTRACT

Managing a reusable resource, such as a pool of integers, involves a doubly linked list of elements that represents free integers in an integer pool. Each element of the doubly linked list includes a next pointer for identifying a next element and a previous pointer for identifying a previous element. A specific free integer can be allocated from the integer pool in an order of one, O(1), operation by indexing into the linked list and then utilizing the next and previous pointers of the linked list element to remove the linked list element from the linked list. The desired element is removed by adjusting the next pointer of the previous element and the previous pointer of the next linked list element. A non-specific free integer can be allocated from the integer pool in an O(1) operation through a head element that identifies a next free integer in the linked list.

33 Claims, 10 Drawing Sheets

Request: Allocate a specific free number (i.e., 4)

Use previous pointer to identify previous element and then adjust next pointer of the previous element Use next pointer to identify next element and then adjust previous pointer of the next element

Allocate 2

FIG. 12

Allocate next free number (1)

METHOD, SYSTEM, AND COMPUTER PROGRAM PRODUCT FOR MANAGING A RE-USABLE RESOURCE

FIELD OF THE INVENTION

The invention relates generally to managing a re-usable resource, and more particularly to managing a pool of integers using a linked list of elements that are stored in computer memory.

BACKGROUND OF THE INVENTION

Figure 1:
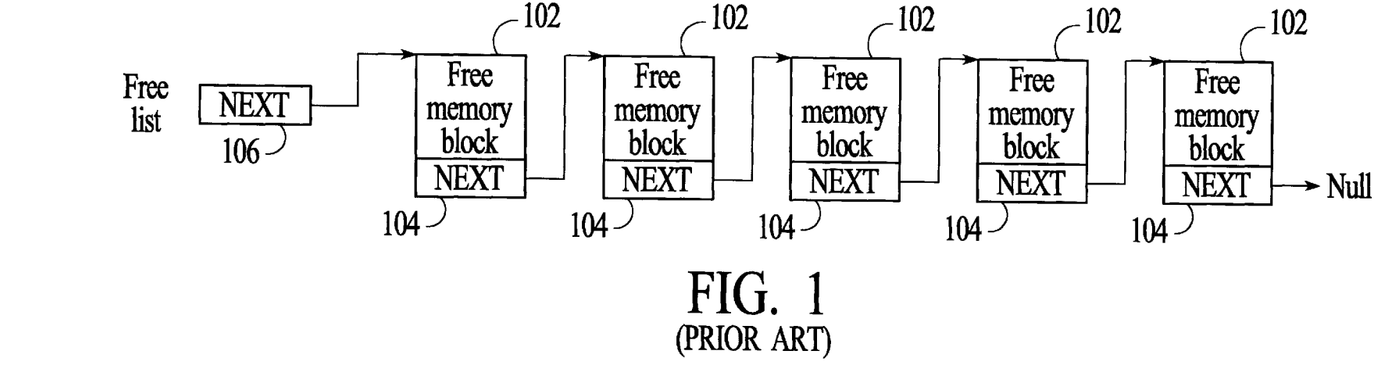
FIG. 1 depicts a series of available memory blocks that are linked together by pointers at the end of each block.

Linked lists are widely used to link blocks of related data within computer memory and to identify blocks of memory that are available to store data. FIG. 1 depicts a series of available memory blocks 102 (also referred to as a "free" list) that are linked together by pointers 104 at the end of each block. The head of the free list is a free list pointer 106 that identifies the first free memory block and the end of the free list is identified by a "null" pointer. When memory blocks are needed to store data, the memory blocks are allocated in successive order from the free list by adjusting the free list pointer to exclude allocated memory blocks.

Figure 2:
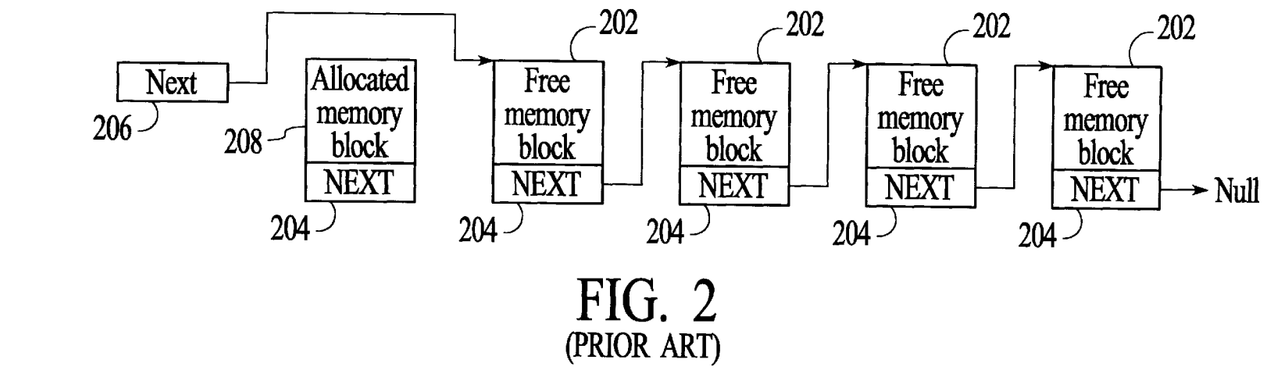
FIG. 2 depicts how the free list pointer of FIG. 1 is adjusted to exclude the first memory block that has been allocated to store data.

FIG. 2 depicts how the free list head pointer 206 is adjusted to exclude the first memory block 208 that has been allocated to store data. When a memory block is no longer needed to store data, the block can be added to the "head" or "front" of the free list by adjusting the free list head pointer to identify the newly freed memory block and by adjusting the pointer of the newly freed memory block to identify the next free memory block. Because newly freed memory blocks are added to the head of the list, the free integers are allocated on a last-in first-out (LIFO) basis. This technique for managing memory works well when the memory blocks are needed to store data, however it is not such an efficient technique for managing a list of integers that are available from an integer pool. Managing a list of integers instead of memory blocks is useful in several computing applications. For example, managing a list of integers is useful for allocating asynchronous transfer mode (ATM) virtual circuits (VCs) in an ATM network. Throughout the description, similar reference numbers may be used to identify similar elements.

Figure 3:
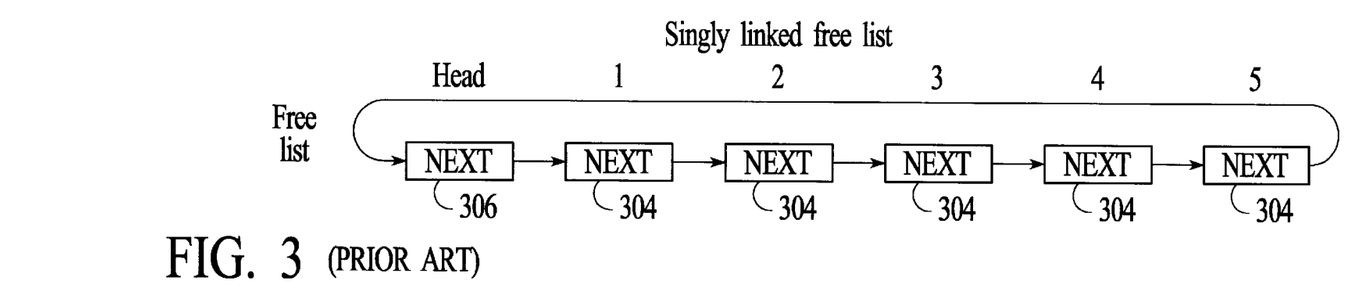
FIG. 3 depicts a singly linked list of free integers where the integers are represented entirely by pointers that indicate the next integer in the list and where the first free integer in the list is indicated by a head element.
Figure 4:
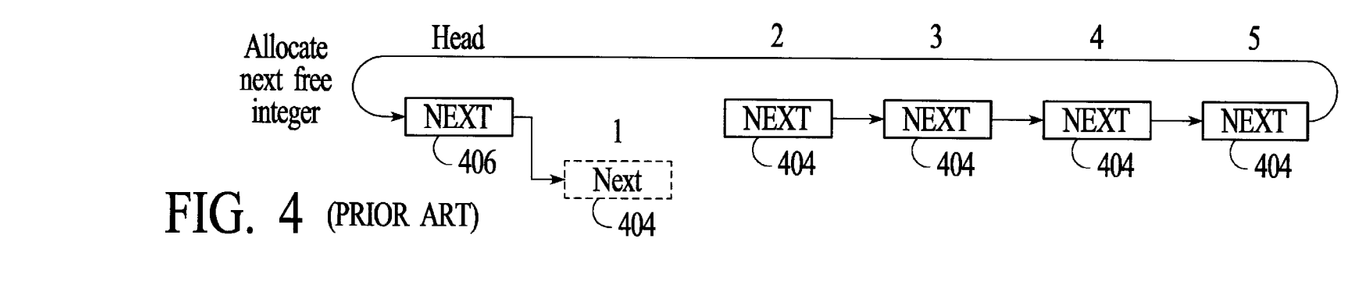
FIG. 4 depicts the next free integer that is to be removed from the singly linked list of FIG. 3.
Figure 5:
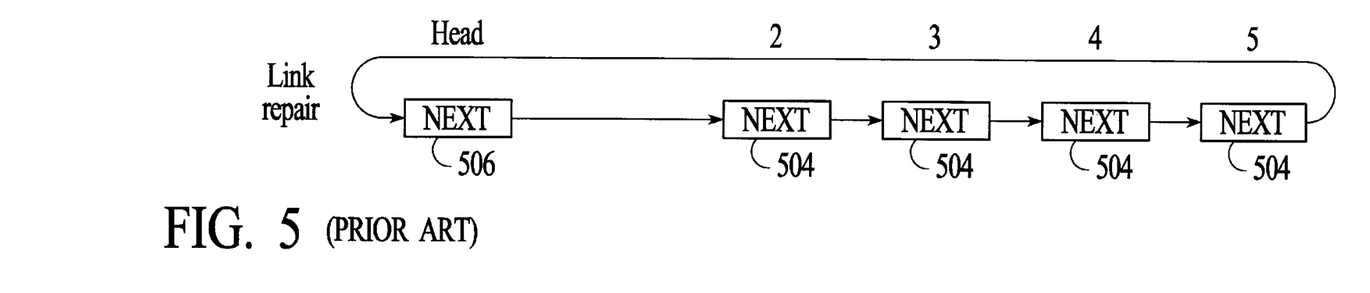
FIG. 5 depicts the singly linked list of FIG. 3 after the pointer of the head element is adjusted to remove integer one from the linked list of free integers.

U.S. Pat. No. 6,233,630 issued to Wilhelm discloses a technique for managing a list of free integers that is memory efficient. The technique involves defining an integer pool by allocating a block of memory for each integer in the pool, with the memory block for each integer consisting entirely of a pointer that identifies the next integer in the linked list of free integers. That is, the integer pool consists entirely of links and therefore the amount of memory required to identify each integer is related to the size of the integer pool. For example 256 integers can be uniquely identified with eight bit pointers. FIG. 3 depicts a linked list of free integers where the integers consist entirely of pointers 304 that indicate the next integer in the list and where the first free integer in the list is indicated by a head element 306. The free integers are allocated in the order of the linked list. For example, when a free integer is needed, the next integer identified by the head element is allocated as indicated in FIG. 4. Allocating an integer (that is, removing the related element from the linked list) involves adjusting the pointer of the head element to identify the next element in the linked list as indicated in FIG. 5. When an allocated integer becomes freed and needs to be added back to the free list, the pointer of the head element is adjusted to identify the linked list element of the newly freed integer and the linked list element of the newly freed integer is adjusted to point to the integer that was previously identified by the head element.

Figure 6:
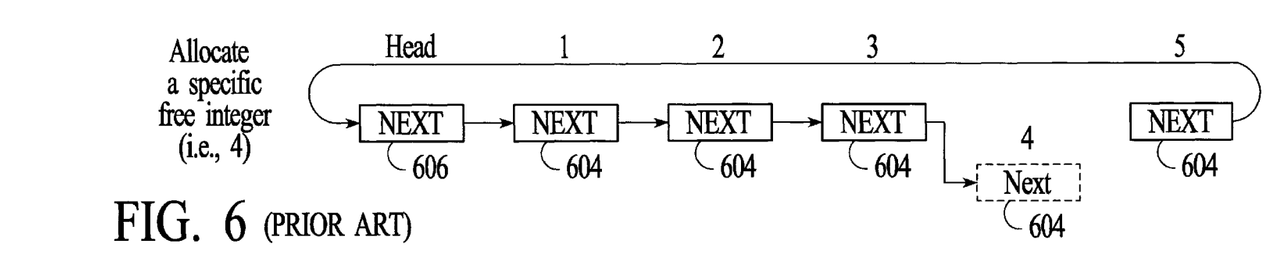
FIG. 6 depicts a specific integer, integer four, that is to be removed from the singly linked list of FIG. 3.

While the technique disclosed by Wilhelm works well to identify a next free integer (i.e., where the next free integer can be any free integer from the integer pool), the technique is not as efficient when a specific integer must be allocated from an integer pool, for example, when trying to reserve a specific ATM VC. A problem involved with allocating a specific integer using a singly linked list is that repairing the linked list of elements is an O(n) operation, where n is the number of integers in the integer pool. That is, allocating a specific integer (for example integer four) involves indexing into the array of linked list elements to the linked list element that represents integer four and then removing the linked list element from the linked list of elements. Removing a specific element from the linked list involves adjusting the pointer value of the element that is directly previous to the specific element to skip over the specific integer. For example, referring to FIG. 6, removing the element that relates to integer four involves adjusting the pointer value of the previous element (i.e., adjusting the pointer for integer three to identify integer five). The problem involved with adjusting the pointer value of the previous element is that the location of the previous element is not readily known. Locating the previous element in a singly linked list is an O(n) operation that involves sequentially searching through the array of elements until the previous element is found. In time critical applications, it is desirable to avoid O(n) operations.

Although the technique described in Wilhelm works well to allocate a unique integer from an integer pool while conserving memory space, in some applications there is a need to allocate specific integers in an efficient manner. As a result, what is needed is an efficient way to allocate free integers from an integer pool that allows the selection of a specific free integer from an integer pool as well as the selection of any free integer from the integer pool.

SUMMARY OF THE INVENTION

The invention involves a doubly linked list of elements that represents free integers in an integer pool. Each element of the doubly linked list includes a next pointer for identifying a next element in the linked list and a previous pointer for identifying a previous element in the linked list. A specific free integer can be allocated from the integer pool in an order of one, O(1), operation by indexing into the linked list to the linked list element that represents the integer and then utilizing the next and previous pointers of the linked list element to remove the linked list element from the linked list. The desired linked list element is removed by adjusting the next pointer of the previous linked list element and the previous pointer of the next linked list element. A non-specific free integer can be allocated from the integer pool in an O(1) operation through a head element that identifies a next free integer in the linked list. A non-specific free integer includes any one of the free integers in the linked list of free integers. Utilizing a doubly linked list, a resource allocation scheme that can allocate a specific free integer and a next free integer in O(1) operations is achieved. In contrast to the doubly linked list, allocating a specific integer from a singly linked list would require searching the entire linked list to find the pointer value that is needed to remove the related linked list element. Searching through the entire linked list is an O(n) operation, which requires more processor cycles and is undesirable in time critical operations.

An embodiment of the invention involves a method for managing a reusable resource. According to the method, an array of linked list elements that defines an integer pool is established, wherein each linked list element includes a next pointer for identifying a next linked list element and a previous pointer for identifying a previous linked list element. A doubly linked list that represents free integers in the integer pool is formed from the linked list elements. A head element, having a next pointer for identifying one end of the doubly linked list and a previous pointer for identifying the other end of the doubly linked list, is established. A specific free integer is allocated by locating the linked list element that corresponds to the specific free integer and using the next and previous pointers of the linked list element to remove the linked list element from the doubly linked list, and a next free integer is allocated by accessing the head element and removing, from the doubly linked list, the linked list element that is identified by the next pointer of the head element.

In an embodiment, allocating a specific free integer includes using the next pointer, of the linked list element that corresponds to the specific integer, to identify the next linked list element in the doubly linked list, adjusting the previous pointer of the identified next linked list element to exclude, from the doubly linked list, the linked list element that corresponds to the specific integer, using the previous pointer, of the linked list element that corresponds to the specific integer, to identify the previous linked list element in the doubly linked list, and adjusting the next pointer of the identified previous linked list element to exclude, from the doubly linked list, the linked list element that corresponds to the specific integer. In an embodiment the previous pointer of the identified next linked list element is set to the same value as the previous pointer of the linked list element that corresponds to the specific integer. In an embodiment, the next pointer of the identified previous linked list element is set to the same value as the next pointer of the linked list element that corresponds to the specific integer.

In a further embodiment of the method, an integer can be added to the doubly linked list by identifying an integer that is to be added to the doubly linked list, locating the linked list element that corresponds to the integer that is to be added to the doubly linked list, and adding the linked list element to the doubly linked list using the next or previous pointer of the head element. In one embodiment the linked list element is added to the front of the doubly linked list using the next pointer of the head element, thereby producing a last-in first-out allocation scheme. In another embodiment, the linked list element is added to the end of the doubly linked list using the previous pointer of the head element, thereby producing a first-in first-out allocation scheme.

In a further embodiment of the invention, allocated integers can be identified by forming a doubly linked list that represents the integers that have been allocated from the integer pool and by establishing a head element for the allocated list having a next pointer for identifying one end of the allocated list and a previous pointer for identifying the other end of the allocated list.

The invention is also embodied as a system for managing a reusable resource and as a computer program product for managing a reusable resource. The system and computer program product implement essentially the same technique as the method that is described above.

Other aspects and advantages of the present invention will become apparent from the following detailed description, taken in conjunction with the accompanying drawings, illustrating by way of example the principles of the invention.

DETAILED DESCRIPTION OF THE INVENTION

The invention involves a doubly linked list of elements that represents free integers in an integer pool. Each element of the doubly linked list includes a next pointer for identifying a next element in the linked list and a previous pointer for identifying a previous element in the linked list. A specific free integer can be allocated from the integer pool in an order of one, O(1), operation by indexing into the linked list to the linked list element that represents the integer and then utilizing the next and previous pointers of the linked list element to remove the linked list element from the linked list. The desired linked list element is removed by adjusting the next pointer of the previous linked list element and the previous pointer of the next linked list element. A non-specific free integer can be allocated from the integer pool in an O(1) operation through a head element that identifies a next free integer in the linked list. A non-specific free integer includes any one of the free integers in the linked list of free integers. Utilizing a doubly linked list, a resource allocation scheme that can allocate a specific free integer and a next free integer in O(1) operations is achieved.

Figure 7:
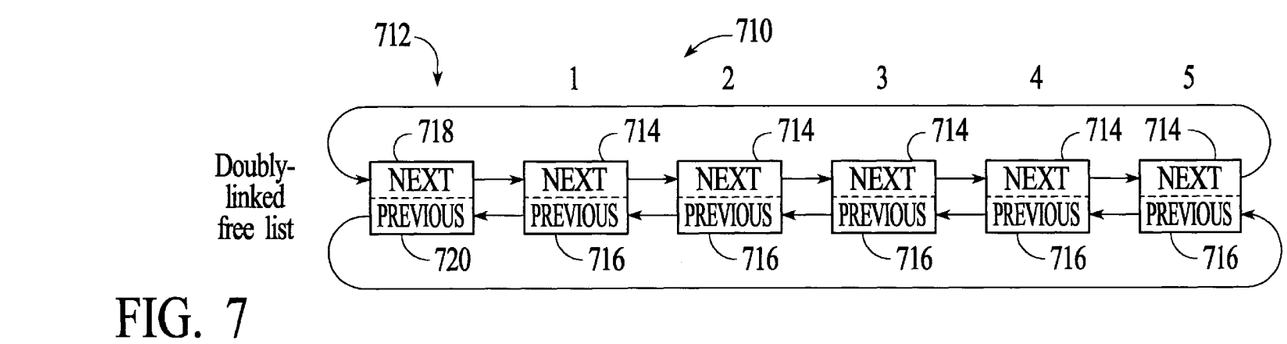
FIG. 7 depicts a doubly linked list and a head element that are used to manage a re-usable resource such as a pool of integers in accordance with an embodiment of the invention.

FIG. 7 depicts a logical representation of a doubly linked list 710 and a head element 712 that are used to manage a re-usable resource such as a pool of integers. The doubly linked list includes a number, n, of linked list elements, where each linked list element is related to a unique one of the n integers. In the example of FIG. 7, the integers associated with the linked list elements are identified above the linked list elements. Each linked list element includes a NEXT pointer 714 for identifying a next linked list element in the list and a PREVIOUS pointer 716 for identifying a previous linked list element in the list. The head element includes a NEXT pointer 718 for identifying the next linked list element and a PREVIOUS pointer 720 for identifying the previous linked list element. In the embodiment of FIG. 7, the NEXT pointer of the head element identifies the head, or front, of the linked list and the PREVIOUS pointer of the head element identifies the end or back of the linked list. In the embodiment of FIG. 7, the linked list of elements represents free integers (unallocated integers) from an integer pool and is referred to as the free list. The act of allocating an integer from the free list involves removing the linked list element that is related to the integer from the linked list. When an allocated integer is no longer needed, it is added back to the free list.

In an embodiment, establishing linked list elements involves allocating an array of n linked list elements in a computer memory, where n is the number of integers that is to be managed. Each of the linked list elements in the array is related to a unique one of the n integers and includes contiguous next and previous pointer fields. Initially, the pointers of the linked list elements are set to link the integers in numerical order (i.e., 1 to n). Likewise, initially the NEXT pointer of the head element is set to identify the linked list element that is related to the first integer (i.e. 1) and the PREVIOUS pointer of the head element is set to identify the linked list element that is related to the last integer (i.e., n).

Figure 8:
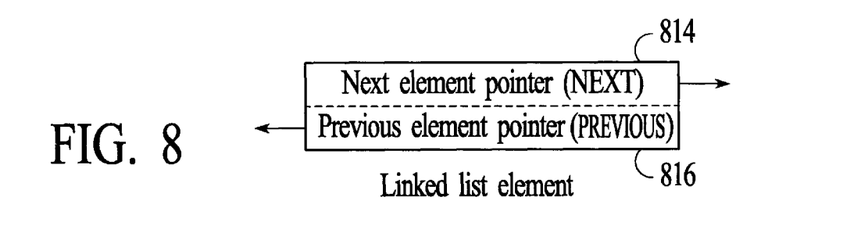
FIG. 8 depicts an expanded view of an example linked list element from the doubly linked list of FIG. 7.

FIG. 8 depicts an expanded view of an example linked list element from the doubly linked list of FIG. 7. The linked list element includes a NEXT pointer 814 for identifying a next linked list element and a PREVIOUS pointer 816 for identifying a previous linked list element. In the embodiment, the pointers identify the linked list elements using the integer values that are related to the linked list elements. That is, the linked list element related to integer one is identified by a binary pointer value of one, the linked list element related to integer two is identified by a binary pointer value of two, and so on. In the embodiment of FIG. 8 the NEXT and PREVIOUS pointer fields include sixteen bits (two bytes) each, such that a total of 65,536 (i.e., integers 0–65,535) integers can be uniquely identified within each field. Although the NEXT and PREVIOUS pointer fields include sixteen bits each in the example of FIG. 8, the pointer fields can be scaled up or down to meet the needs of an individual application. For example, up to 255 integers can be uniquely represented with eight bit NEXT and PREVIOUS pointer fields.

Figure 9A:
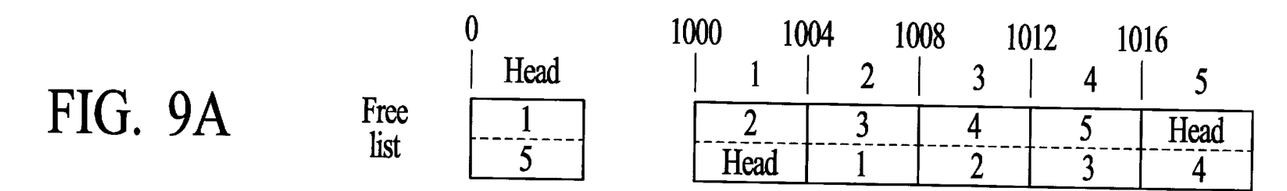
FIG. 9A depicts a head element and a doubly linked list of linked list elements that represents free integers in an integer pool in accordance with an embodiment of the invention.

Utilizing a doubly linked list to manage a pool of integers is described in detail with reference to FIGS. 9A–9C. FIG. 9A depicts a head element and a doubly linked list of free, or unallocated, linked list elements that represents free integers in an integer pool. In the example, the free integers are 1, 2, 3, 4, and 5 and each linked list element consumes four bytes of memory. It should be understood that an integer pool of 65,535 (i.e., integers 1–65,535 with zero being reserved for identifying the head element) can be uniquely identified with four byte linked list elements. Referring to FIG. 9A, the linked list element that represents integer one starts at example memory address 1000, the linked list element that represents integer two starts at example memory address 1004 (the start address plus four bytes) and so on. The NEXT pointer of the head element identifies the linked list element for integer one (which is the integer at the head of the free list) and the PREVIOUS pointer of the head element identifies the linked list element for integer five (which is the integer at the end of the free list). In the initial state, the NEXT and PREVIOUS pointers of the linked list elements are set to values that establish the linked list in numbered order (i.e., 1, 2, 3, 4, 5), although the initial order is disrupted as integers are allocated and then returned to the free list. In order to establish a connection to the head element, the PREVIOUS pointer of linked list element one (the first element in the linked list) and the NEXT pointer of linked list element five (the last element in the linked list) point to the head element. In an embodiment, a null value (i.e., zero) is used to identify the head element.

The doubly linked list technique described with reference to FIGS. 7–9C is used to allocate specific free integers and next free integers in O(1) operations. The operation of allocating a specific free integer involves indexing into the array of linked list elements to the linked list element that is related to the specific integer and then using the NEXT and PREVIOUS pointers of the linked list element to remove the linked list element from the linked list. For example, referring to FIG. 9B, allocating integer four from the linked list of FIG. 9A involves using the NEXT and PREVIOUS pointers to identify and adjust pointers of the directly linked elements. Specifically, the PREVIOUS pointer of linked list element four is used to identify the previous element (linked list element three) and to adjust the NEXT pointer of the previous element to exclude linked list element four. Likewise, the NEXT pointer of linked list element four is used to identify the next element (linked list element five) and to adjust the PREVIOUS pointer of the next element to exclude linked list element four.

Figure 9B:
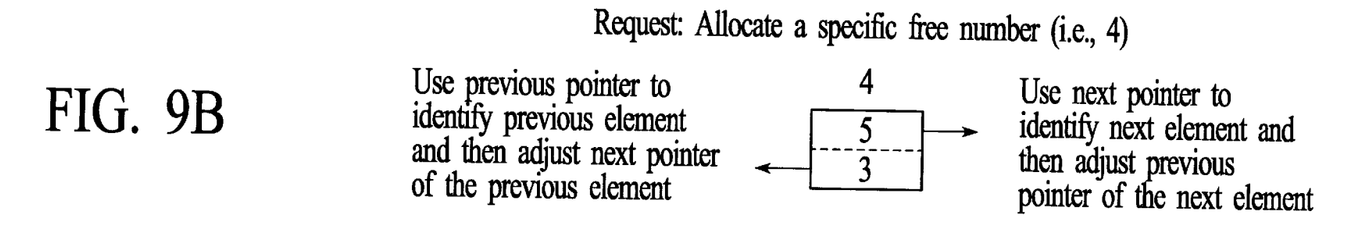
FIG. 9B depicts how the NEXT and PREVIOUS pointers of a specific integer are used to remove the specific integer from a doubly linked list of free integers in accordance with an embodiment of the invention.

In the example of FIG. 9B, the PREVIOUS pointer of element four is used to identify linked list element three and the NEXT pointer of linked list element three is adjusted to identify linked list element five (the same value as the next pointer of element four). In addition, the NEXT pointer of element four is used to identify linked list element five and the PREVIOUS pointer of linked list element five is adjusted to identify linked list element three (the same value as the previous pointer of element four).

Figure 9C:
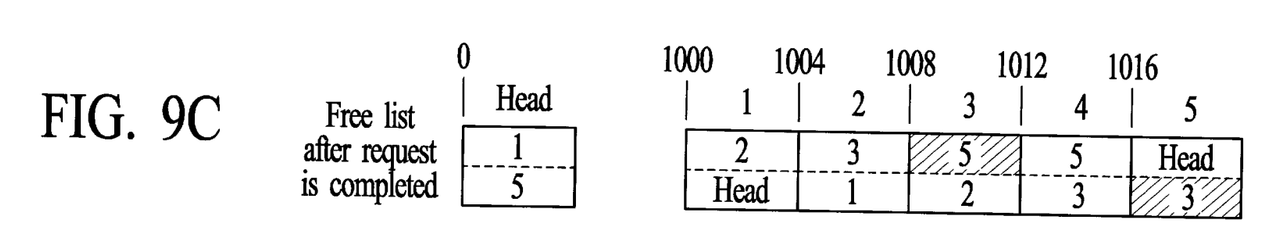
FIG. 9C depicts the doubly linked list of FIG. 9A after the specific integer has been removed from the doubly linked list of free integers.

FIG. 9C depicts the linked list after linked list elements three and five have been adjusted to remove linked list element four from the free list, that is, after integer four has been allocated. Because the specific integer is allocated without having to search through the array of elements to locate the previous element in the linked list, the integer is allocated in an O(1) operation. Without the PREVIOUS pointer of the doubly linked list, removing element four from a singly linked list would require searching the entire linked list to find the pointer that identifies the allocated integer and then copying the pointer value of the allocated integer into the pointer of the previous linked list element. Searching through the entire linked list is an O(n) operation, which requires more processor cycles and is undesirable in time critical operations.

The operation of allocating the next free integer involves accessing the head element and referring to the NEXT pointer of the head element to identify the next free integer. In the example of FIG. 9A, the head element identifies integer one and therefore a request for the next free integer results in integer one being allocated. Allocating integer one involves removing the linked list element related to integer one from the linked list by adjusting the NEXT pointer of the head element and the PREVIOUS pointer of the integer that is linked to the newly allocated integer. For example, referring to FIG. 9A, the NEXT pointer of the head would be adjusted to identify integer two and the PREVIOUS pointer of integer two would be adjusted to identify the head. Because integer one is allocated in one operation without having to search through the array of elements, the integer allocation is an O(1) operation. In the embodiment of FIGS. 7–9C, a request for "any" free integer (that is, where the only requirement is that the integer is free) is satisfied in the same manner as a request for the next free integer. For example, when a request for a free integer does not specify a specific integer, the next free integer is allocated in response to the request.

As briefly stated above, the operation of freeing an integer involves adding the freed integer (and therefore its related linked list element) back to the linked list of free integers. In one embodiment, freed integers are added to the head or front of the linked list of free integers. Adding a freed integer to the front of the linked list involves adjusting the NEXT pointer of the head element to identify the newly freed integer and adjusting the PREVIOUS pointer of the integer that was at the front of the linked list before the addition of the freed integer. Adding freed integers to the front of the linked list causes the integers to be allocated on a last-in first-out (LIFO) basis in response to requests for the next free, or any free, integer. That is, the last integer to be added to the free list is the first integer allocated from the list in response to a request for the next free or any free integer. Adding freed integers to the front of the list is an O(1) operation.

In another embodiment, freed integers are added to the end or tail of the linked list of free integers. Adding a freed integer to the end of the linked list involves adjusting the PREVIOUS pointer of the head element to identify the newly freed integer and adjusting the NEXT pointer of the integer that was at the end of the linked list before the addition of the freed integer. Adding freed integers to the end of the linked list causes the integers to be allocated on a first-in first-out (FIFO) basis in response to requests for the next free, or any free, integer. That is, the first integer to be added to the free list is the first integer allocated from the list in response to a request for the next free, or any free, integer.

Allocating integers on a FIFO basis instead of a LIFO basis is advantageous in some applications because it increases the delay between allocations of the same integer. Adding free integers to the end of a doubly linked free list is an O(1) operation because the PREVIOUS pointer of the head element identifies the end of the linked list. In contrast, adding a free integer to the end of a singly linked free list is not an O(1) operation because the end of the singly linked list is not readily known. With a singly linked list, the end of the singly linked list is determined by searching through the linked list in an O(n) operation.

An embodiment of the invention includes a free list and an allocated list that work in tandem to manage a pool of integers. The free list is described above and the allocated list is a doubly linked list that is essentially the same as the free list. The allocated list includes an allocated list head element having NEXT and PREVIOUS pointers that identify the first and last elements in the linked list of allocated integers. Providing both a free list and an allocated list allows for easy call up and display of the free integers and/or the allocated integers. If a free list is the only list that is maintained then it is not an efficient operation to call up the allocated integers. In an embodiment, an extra field (i.e., a single bit) may be added to the linked list elements to identify whether the elements are linked to the free list or to the allocated list.

Figure 10:
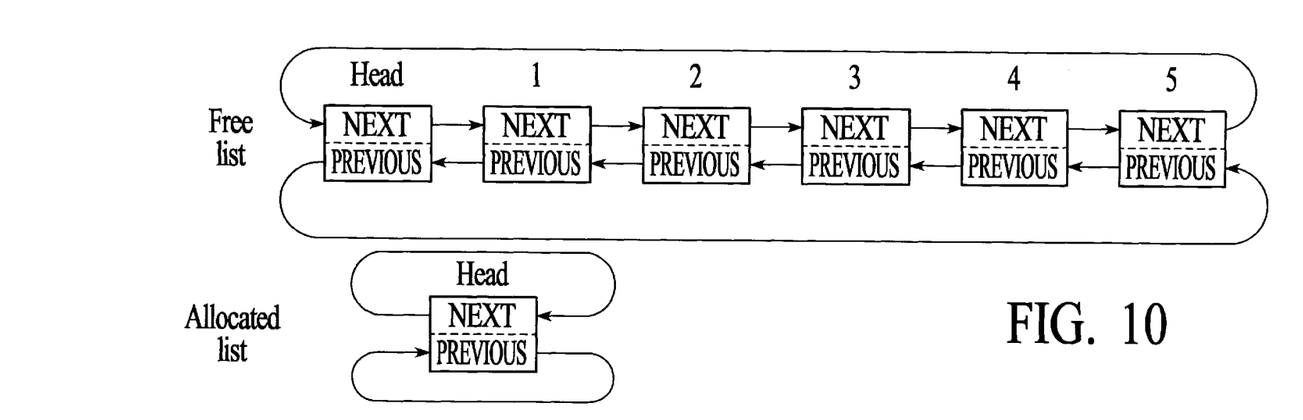
FIG. 10 depicts a free list head element, an allocated list head element, and a pool of five integers that are initially linked on the free list.

FIGS. 10–17 depict examples of dual doubly linked lists that are used to manage a re-usable resource such as a pool of integers. FIG. 10 depicts a free list, an allocated list, and a pool of five integers. FIG. 10 represents an initial state in which all five integers are on the free list. In the embodiment, the five integers are initially linked in numerical order (i.e., 1, 2, 3, 4, 5). Referring to the free list head element, the NEXT pointer identifies integer one and the PREVIOUS pointer identifies integer five. Referring to the allocated list head element, the NEXT and PREVIOUS pointers point to themselves.

Figure 11:
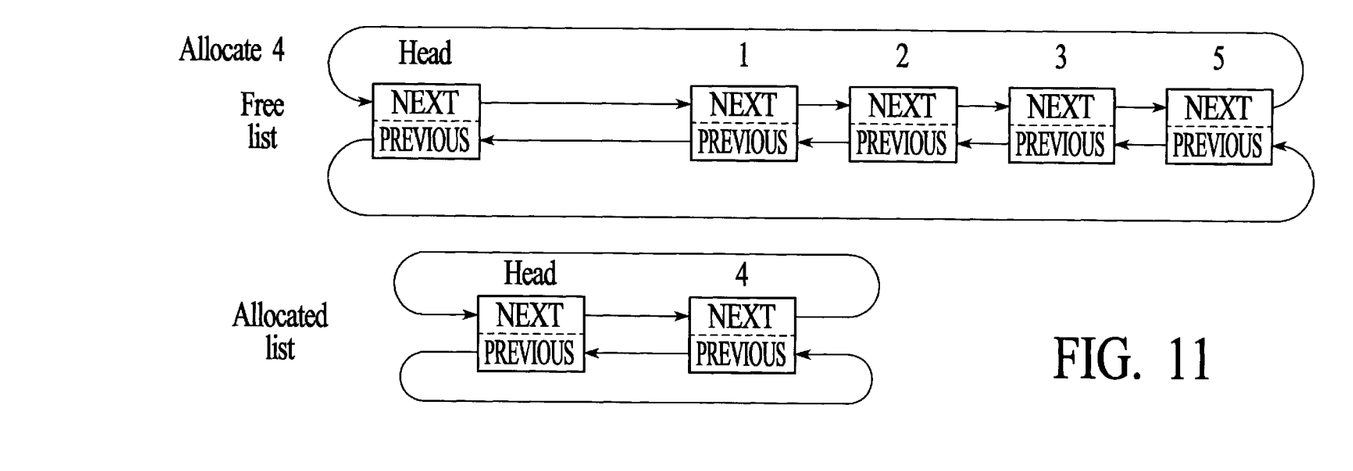
FIG. 11 depicts the free and allocated lists from FIG. 10 after a specific integer, integer four, is allocated.

Allocating a specific integer from the integer pool involves indexing into the location of the specific integer and removing the integer from the free list (as described above with reference to FIGS. 9A–9C). The allocated integer is then added to the allocated list. FIG. 11 depicts a logical representation of the free and allocated lists from FIG. 10 after a specific integer, integer four, is allocated. The linked list element for integer four is removed from the free list and added to the allocated list in two O(1) operations. The NEXT and PREVIOUS pointers of the adjacent linked list elements are adjusted utilizing the NEXT and PREVIOUS pointers of the doubly linked lists.

Figure 12:
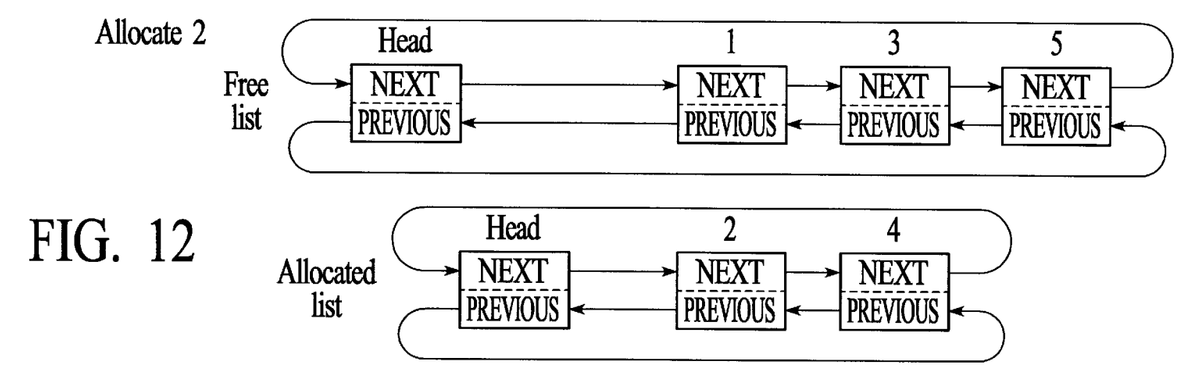
FIG. 12 depicts the free and allocated lists from FIG. 11 after another specific integer, integer two, is allocated.

FIG. 12 depicts a logical representation of the free and allocated lists from FIG. 11 after another specific integer, integer two, is allocated. The linked list element for integer two is removed from the free list and added to the allocated list in two O(1) operations. In the embodiment of FIG. 12, the allocated integer is added to the front of the allocated list although it could alternatively be added to the end of the allocated list as described above.

Figure 13:
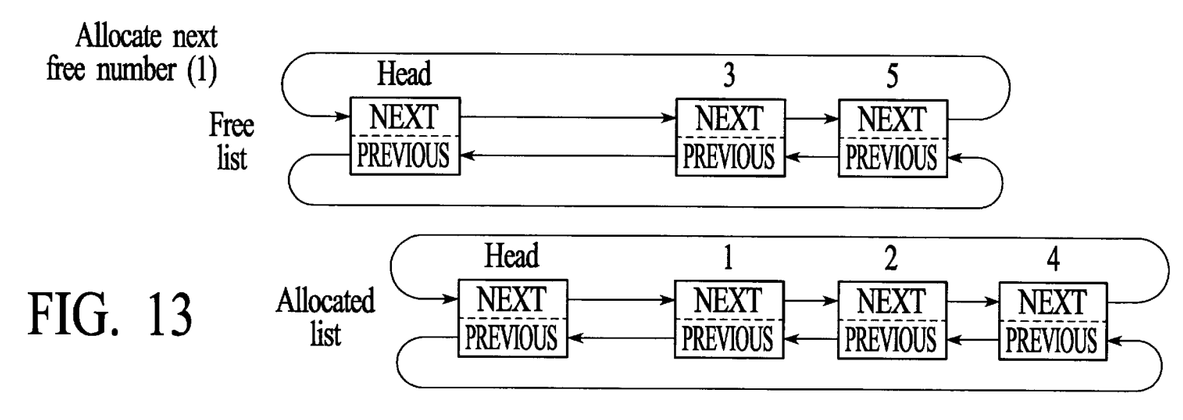
FIG. 13 depicts the free and allocated lists from FIG. 12 after the next free integer, integer one, is allocated.

Allocating a next free, or any free, integer from the integer pool involves accessing the head element and removing the integer/element that is identified by the NEXT pointer of the head element. FIG. 13 depicts a logical representation of the free and allocated lists from FIG. 12 after the next free integer is allocated. The element identified by the NEXT pointer (linked list element one) is removed from the free list in an O(1) operation. In the embodiment of FIG. 13, the allocated integer is added to the front of the allocated list.

Figure 14:
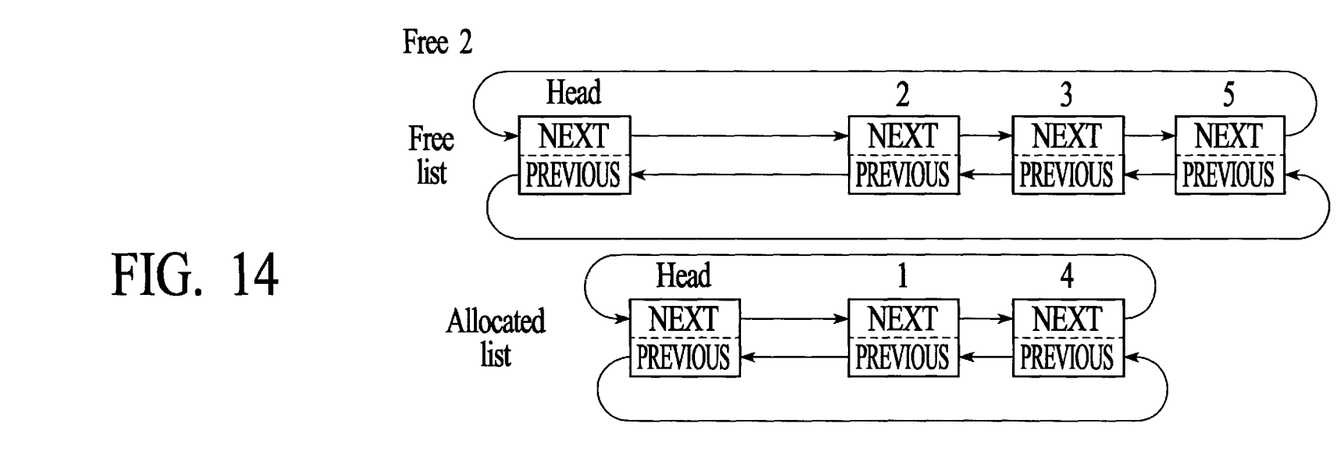
FIG. 14 depicts the free and allocated lists from FIG. 13 after a specific integer, integer two, is added to the free list in a last-in first-out (LIFO) manner.

FIG. 14 depicts a logical representation of the free and allocated lists from FIG. 13 after a specific integer, integer two, is freed (that is, added to the free list). The linked list element for integer two is removed from the allocated list and added back to the free list in two O(1) operations. The freed integer is added to the front of the free list, thereby producing a LIFO allocation scheme.

Figure 15:
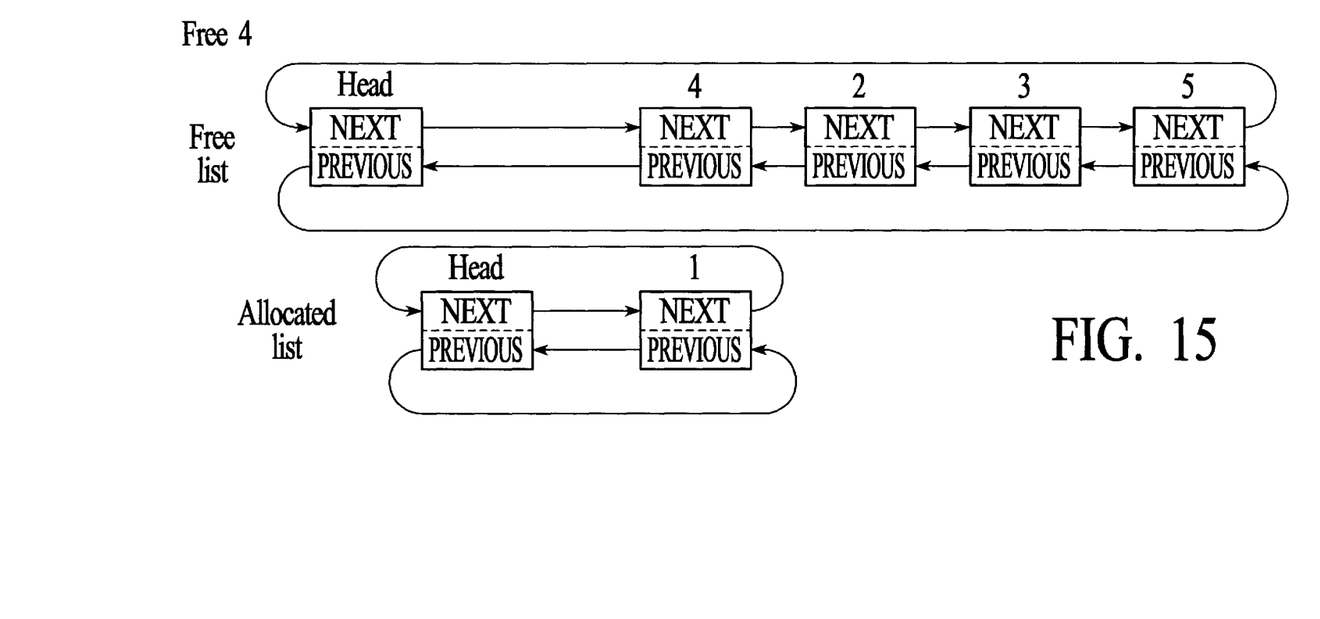
FIG. 15 depicts the free and allocated lists from FIG. 14 after another specific integer, integer four, is added to the free list in a LIFO manner.

FIG. 15 depicts a logical representation of the free and allocated lists from FIG. 14 after another specific integer, integer four, is freed. The linked list element for integer four is removed from the allocated list and added to the free list in two O(1) operations. The freed integer is added to the front of the free list, thereby maintaining the LIFO allocation scheme.

Figure 16:
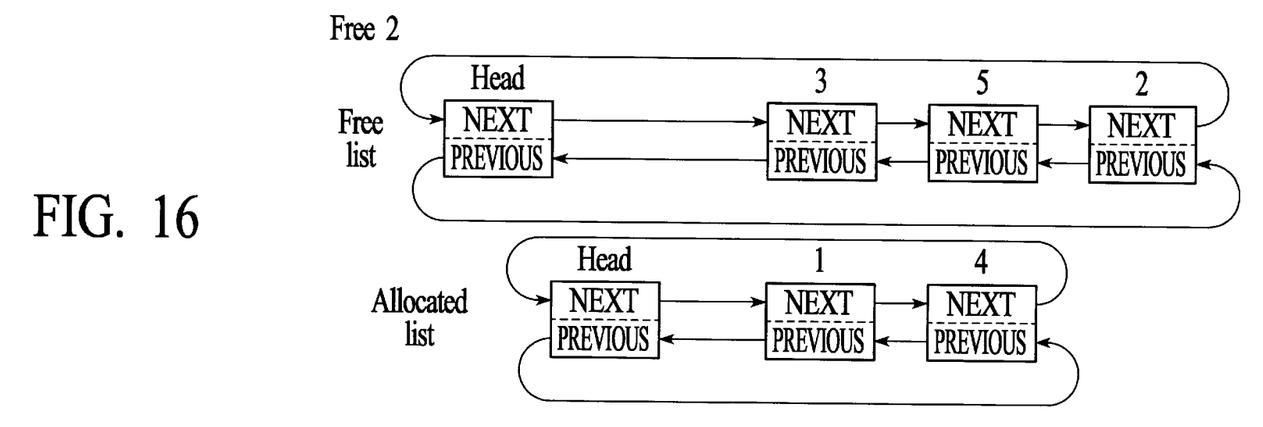
FIG. 16 depicts the free and allocated lists from FIG. 13 after a specific integer, integer two, is added to the free list in a first-in first-out (FIFO) manner.

In an alternative embodiment, freed integers are added to the end of the free list, thereby producing a FIFO allocation scheme. FIG. 16 depicts a logical representation of the free and allocated lists from FIG. 13 after integer two is freed and added to the end of the free list instead of to the front of the free list as is the case in FIG. 14. The free list of FIG. 16, which produces a FIFO allocation scheme in response to requests for the next free, or any free integer is in contrast to the free list of FIG. 14, which produces a LIFO allocation scheme in response to requests for the next free, or any free integer.

Figure 17:
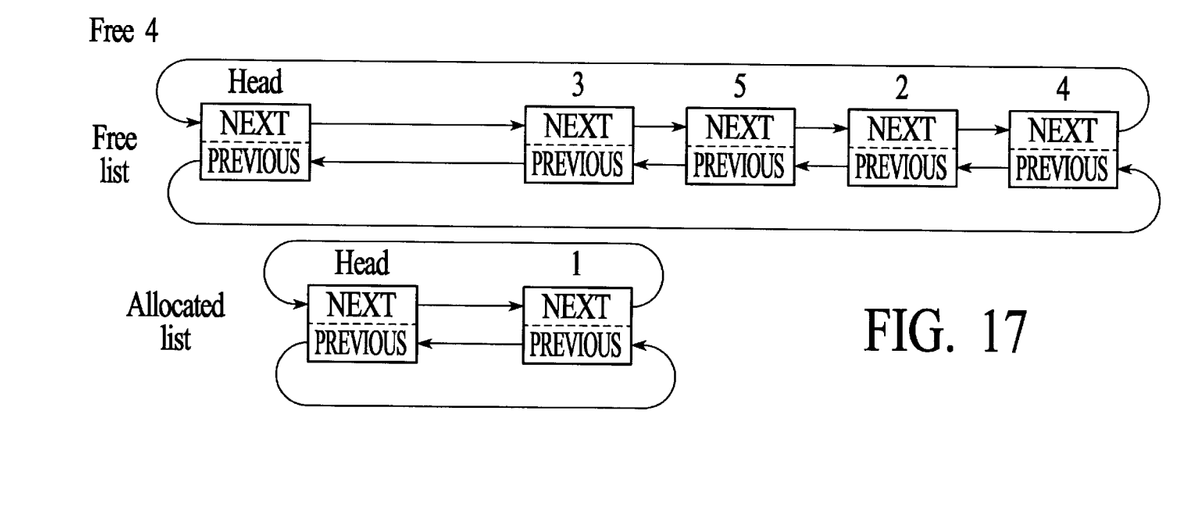
FIG. 17 depicts the free and allocated lists from FIG. 16 after another specific integer, integer four, is added to the free list in a FIFO manner.

FIG. 17 depicts a logical representation of the free and allocated lists from FIG. 16 after integer four is freed and added to the end of the free list instead of to the front of the free list as is the case in FIG. 15. The free list of FIG. 16, which produces a FIFO allocation scheme in response to requests for the next free, or any free integer is in contrast to the free list of FIG. 15, which produces a LIFO allocation scheme in response to requests for the next free, or any free integer.

Figure 18:
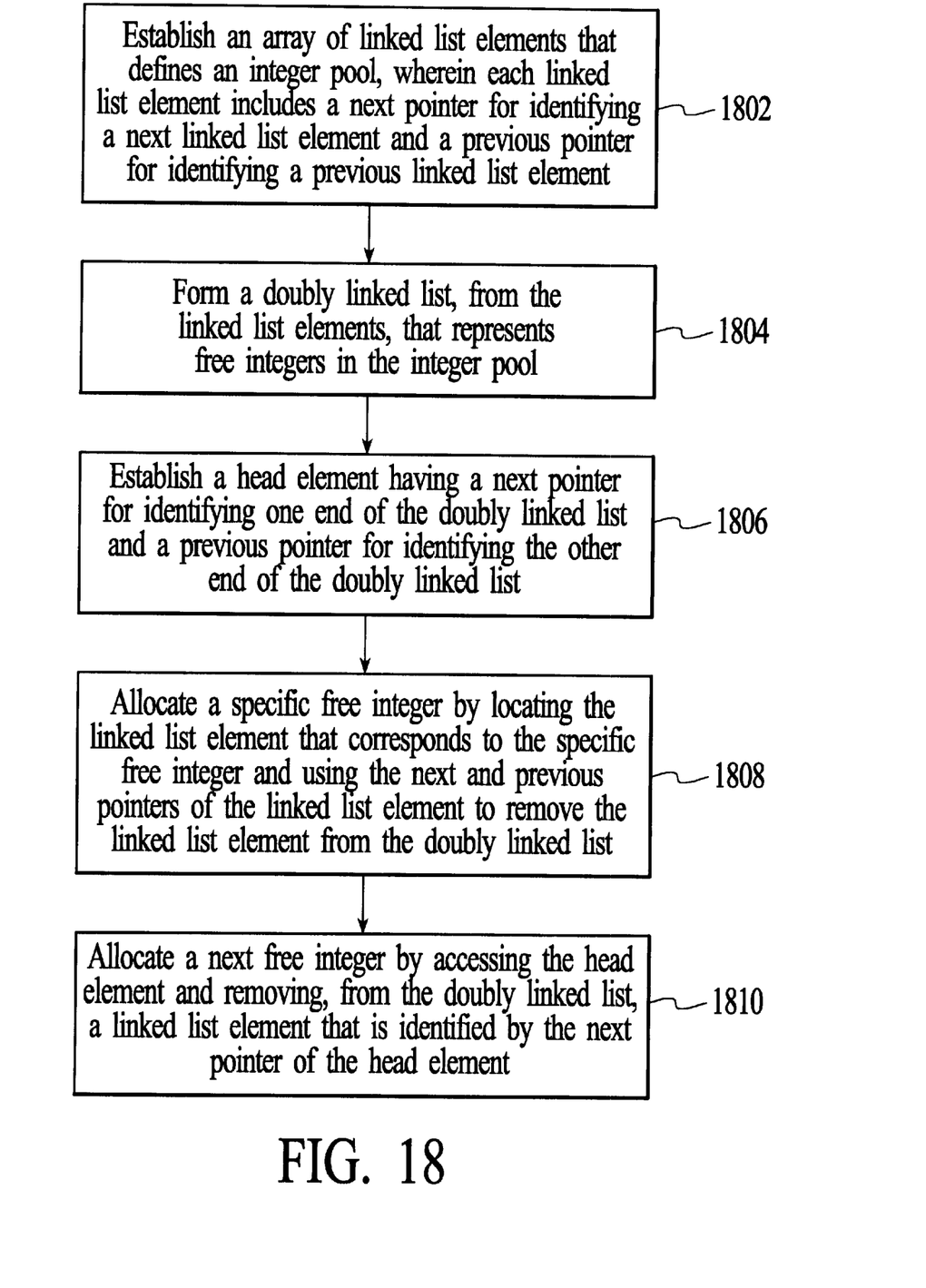
FIG. 18 depicts a process flow diagram for managing a re-usable resource in accordance with an embodiment of the invention.

FIG. 18 depicts a process flow diagram of a method for managing a reusable resource. At step 1802, an array of linked list elements that defines an integer pool is established, wherein each linked list element includes a next pointer for identifying a next linked list element and a previous pointer for identifying a previous linked list element. At step 1804, a doubly linked list, that represents free integers in the integer pool, is formed from the linked list elements. At step 1806, a head element having a next pointer for identifying one end of the doubly linked list and a previous pointer for identifying the other end of the doubly linked list is established. At step 1808, a specific free integer is allocated by locating the linked list element that corresponds to the specific free integer and using the next and previous pointers of the linked list element to remove the linked list element from the doubly linked list. At step 1810, a next free integer is allocated by accessing the head element and removing, from the linked list, a linked list element that is identified by the next or previous pointer of the head element.

Figure 19:
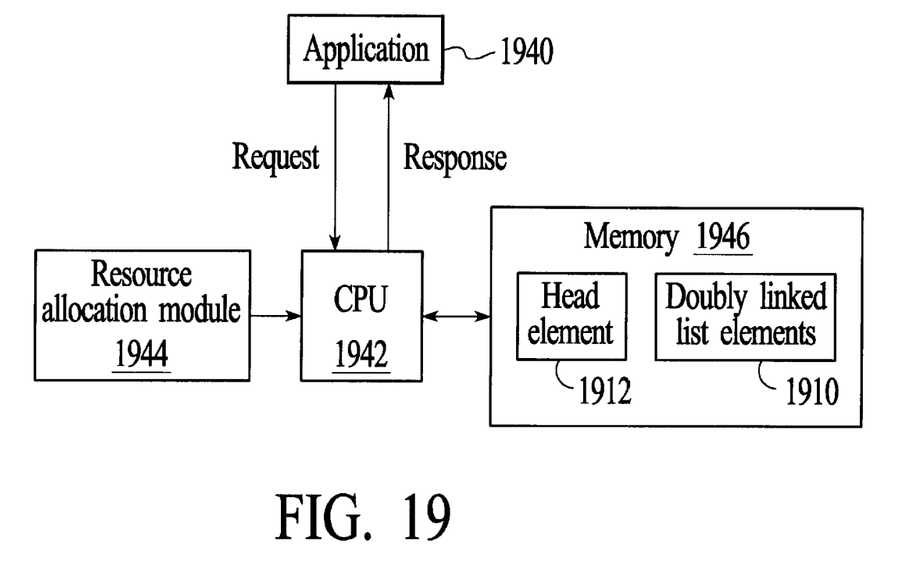
FIG. 19 depicts a system for managing a re-usable resource such as a pool of integers in accordance with an embodiment of the invention.

FIG. 19 depicts an embodiment of a system for managing a re-usable resource such as a pool of integers. The system includes an application 1940, a central processing unit (CPU) 1942, a resource allocation module 1944, and a memory 1946 that stores a head element 1912 and linked list elements 1910. The application includes any application that requires unique integers from a pool of integers. In an embodiment, the application generates a request for a free integer and receives a free integer in response. The CPU is a multifunction processor that implements software instructions that are stored in memory. In an embodiment, the resource allocation module is a set of software instructions (computer code) that implements the technique for managing a reusable resource that is described above with reference to FIGS. 7–18. The memory is computer memory, such as DRAM, that is accessible to the CPU. The memory includes a head element and doubly linked list elements that are established and managed via the resource allocation module.

Although specific embodiments of the invention have been described and illustrated, the invention is not to be limited to the specific forms or arrangements of parts as described and illustrated. The invention is limited only by the claims.

What is claimed is:

1. A method for managing a re-usable resource comprising:

establishing an array of linked list elements that defines an integer pool, wherein each linked list element includes a next pointer for identifying a next linked list element and a previous pointer for identifying a previous linked list element;

forming a doubly linked list, from said linked list elements, that represents free integers in said integer pool;

establishing a head element having a next pointer for identifying one end of said doubly linked list and a previous pointer for identifying the other end of said doubly linked list;

allocating a specific free integer by locating the linked list element that corresponds to said specific free integer and using the next and previous pointers of said linked list element to remove said linked list element from said doubly linked list; and allocating a next free integer by accessing said head element and removing, from said doubly linked list, the linked list element that is identified by the next pointer of said head element.

2. The method of claim 1 wherein said step of allocating a specific free integer includes;

using the next pointer, of said linked list element that corresponds to said specific integer, to identify the next linked list element in said doubly linked list;

adjusting the previous pointer of said identified next linked list element to exclude, from said doubly linked list, said linked list element that corresponds to said specific integer;

using the previous pointer, of said linked list element that corresponds to said specific integer, to identify the previous linked list element in said doubly linked list; and adjusting the next pointer of said identified previous linked list element to exclude, from said doubly linked list, said linked list element that corresponds to said specific integer.

3. The method of claim 2 wherein said step of adjusting the previous pointer of said identified next linked list element includes setting the previous pointer of said identified next linked list element to the same value as the previous pointer of said linked list element that corresponds to said specific integer.

4. The method of claim 2 wherein said step of adjusting the next pointer of said identified previous linked list element includes setting the next pointer of said identified previous linked list element to the same value as the next pointer of said linked list element that corresponds to said specific integer.

5. The method of claim 1 further including:

identifying an integer that is to be added to said doubly linked list;

locating said linked list element that corresponds to said integer that is to be added to said doubly linked list; and adding said linked list element to said doubly linked list using the next or previous pointer of said head element.

6. The method of claim 5 wherein said linked list element is added to the front of said doubly linked list using the next pointer of said head element, thereby producing a last-in first-out allocation scheme.

7. The method of claim 5 wherein said linked list element is added to the end of said doubly linked list using the previous pointer of said head element, thereby producing a first-in first-out allocation scheme.

8. The method of claim 1 further including:

forming a doubly linked list that represents the integers that have been allocated from said integer pool; and establishing a head element for said allocated list having a next pointer for identifying one end of said allocated list and a previous pointer for identifying the other end of said allocated list.

9. A system for managing a re-usable resource comprising:

an array of linked list elements that defines an integer pool, wherein each linked list element includes a next pointer for identifying a next linked list element and a previous pointer for identifying a previous linked list element, and wherein linked list elements related to free integers from said integer pool are linked together to form a doubly linked list;

a head element having a next pointer for identifying one end of said doubly linked list and a previous pointer for identifying the other end of said doubly linked list; and means for:

allocating a specific free integer by locating the linked list element that corresponds to said specific free integer and using the next and previous pointers of said linked list element to remove said linked list element from said doubly linked list; and allocating a next free integer by accessing said head element and removing, from said doubly linked list, the linked list element that is identified by the next pointer of said head element.

10. The system of claim 9 further including means for;

using the next pointer, of said linked list element that corresponds to said specific integer, to identify the next linked list element in said doubly linked list;

adjusting the previous pointer of said identified next linked list element to exclude, from said doubly linked list, said linked list element that corresponds to said specific integer;

using the previous pointer, of said linked list element that corresponds to said specific integer, to identify the previous linked list element in said linked list; and adjusting the next pointer of said identified previous linked list element to exclude, from said linked list, said linked list element that corresponds to said specific integer.

11. The system of claim 10 further including means for setting the previous pointer of said identified next linked list element to the same value as the previous pointer of said linked list element that corresponds to said specific integer.

12. The system of claim 10 further including means for setting the next pointer of said identified previous linked list element to the same value as the next pointer of said linked list element that corresponds to said specific integer.

13. The system of claim 9 further including means for:

identifying an integer that is to be added to said doubly linked list;

locating said linked list element that corresponds to said integer that is to be added to said doubly linked list; and adding said linked list element to said doubly linked list using the next or previous pointer of said head element.

14. The system of claim 13 wherein said linked list element is added to the front of said linked list using the next pointer of said head element, thereby producing a last-in first-out allocation scheme.

15. The system of claim 13 wherein said linked list element is added to the end of said linked list using the previous pointer of said head element, thereby producing a first-in first-out allocation scheme.

16. The system of claim 9 further including means for:

forming a doubly linked list that represents the integers that have been allocated from said integer pool; and establishing a head element for said allocated list having a next pointer for identifying one end of said allocated list and a previous pointer for identifying the other end of said allocated list.

17. A computer program product for managing a re-usable resource, said computer program product comprising:

computer code for:

establishing an array of linked list elements that defines an integer pool, wherein each linked list element includes a next pointer for identifying a next linked list element and a previous pointer for identifying a previous linked list element;

forming a doubly linked list, from said linked list elements, that represents free integers in said integer pool;

establishing a head element having a next pointer for identifying one end of said doubly linked list and a previous pointer for identifying the other end of said doubly linked list;

allocating a specific free integer by locating the linked list element that corresponds to said specific free integer and using the next and previous pointers of said linked list element to remove said linked list element from said doubly linked list; and allocating a next free integer by accessing said head element and removing, from said doubly linked list, the linked list element that is identified by the next pointer of said head element.

18. The computer program product of claim 17 further including computer code for;

using the next pointer, of said linked list element that corresponds to said specific integer, to identify the next linked list element in said linked list;

adjusting the previous pointer of said identified next linked list element to exclude, from said linked list, said linked list element that corresponds to said specific integer;

using the previous pointer, of said linked list element that corresponds to said specific integer, to identify the previous linked list element in said linked list; and adjusting the next pointer of said identified previous linked list element to exclude, from said linked list, said linked list element that corresponds to said specific integer.

19. The computer program product of claim 18 further including computer code for setting the previous pointer of said identified next linked list element to the same value as the previous pointer of said linked list element that corresponds to said specific integer.

20. The computer program product of claim 18 further including computer code for setting the next pointer of said identified previous linked list element to the same value as the next pointer of said linked list element that corresponds to said specific integer.

21. The computer program product of claim 17 further including computer code for:
- identifying an integer that is to be added to said doubly linked list;
- locating said linked list element that corresponds to said integer that is to be added to said doubly linked list; and
- adding said linked list element to said doubly linked list using the next or previous pointer of said head element.

22. The computer program product of claim 21 wherein said linked list element is added to the front of said doubly linked list using the next pointer of said head element, thereby producing a last-in first-out allocation scheme.

23. The computer program product of claim 21 wherein said linked list element is added to the end of said doubly linked list using the previous pointer of said head element, thereby producing a first-in first-out allocation scheme.

24. The computer program product of claim 17 further including computer code for:
- forming a doubly linked list that represents the integers that have been allocated from said integer pool; and
- establishing a head element for said allocated list having a next pointer for identifying one end of said allocated list and a previous pointer for identifying the other end of said allocated list.

25. A method for managing a re-usable resource comprising:
- establishing a linked list of linked list elements that represents a free list of integers from an integer pool, wherein each linked list element includes a next pointer for identifying a next linked list element and a previous pointer for identifying a previous linked list element;
- identifying a specific integer that is to be removed from said free list;
- locating the linked list element that corresponds to said specific integer that is to be removed from said free list; and
- using the next pointer and the previous pointer, of said linked list element that corresponds to said specific integer, to remove said linked list element from said free list.

26. The method of claim 25 further including:
- establishing a head element having a next pointer for identifying one end of said linked list and a previous pointer for identifying the other end of said linked list; and
- using the next pointer of said head element to remove a next linked list element form said free list.

27. The method of claim 25 wherein said step of using the next pointer and the previous pointer to remove said linked list element from said free list includes;
- using the next pointer, of said linked list element that corresponds to said specific integer, to identify the next linked list element in said free list;
- adjusting the previous pointer of said identified next linked list element to exclude, from said free list, said linked list element that corresponds to said specific integer;
- using the previous pointer, of said linked list element that corresponds to said specific integer, to identify the previous linked list element in said free list; and
- adjusting the next pointer of said identified previous linked list element to exclude, from said free list, said linked list element that corresponds to said specific integer.

28. The method of claim 27 wherein said step of adjusting the previous pointer of said identified next linked list element includes setting the previous pointer of said identified next linked list element to the same value as the previous pointer of said linked list element that corresponds to said specific integer.

29. The method of claim 27 wherein said step of adjusting the next pointer of said identified previous linked list element includes setting the next pointer of said identified previous linked list element to the same value as the next pointer of said linked list element that corresponds to said specific integer.

30. The method of claim 25 further including:
- identifying a specific integer that is to be added to said free list;
- locating said linked list element that corresponds to said specific integer that is to be added to said free list; and
- adding, to said free list, said linked list element that corresponds to said specific integer that is to be added to said free list.

31. The method of claim 30 wherein said linked list element is added to the front of said free list using the previous pointer of a head element, thereby producing a last-in first-out allocation scheme.

32. The method of claim 30 wherein said linked list element is added to the end of said free list using the next pointer of a head element, thereby producing a first-in first-out allocation scheme.

33. The method of claim 25 further including:
- forming a linked list that represents the integers that have been allocated from said integer pool; and
- establishing a head element for said allocated list having a next pointer for identifying one end of said allocated list and a previous pointer for identifying the other end of said allocated list.

* * * * *